United States Patent [19]

Elleaume

[11] Patent Number: 4,929,954

[45] Date of Patent: * May 29, 1990

[54] DEVICE FOR COMPUTING A SLIDING AND NONRECURSIVE DISCRETE FOURIER TRANSFORM AND ITS APPLICATION TO A RADAR SYSTEM

[75] Inventor: Philippe Elleaume, Antony, France

[73] Assignee: Thomson-CSF, Paris, France

[*] Notice: The portion of the term of this patent subsequent to Sep. 20, 2005 has been disclaimed.

[21] Appl. No.: 910,578

[22] Filed: Sep. 23, 1986

[30] Foreign Application Priority Data

Sep. 24, 1985 [FR] France .................. 85 14136

[51] Int. Cl.⁵ .................................. G01S 7/44
[52] U.S. Cl. ...................... 342/194; 342/196; 364/726
[58] Field of Search ............ 342/196, 194; 364/726, 364/827

[56] References Cited

U.S. PATENT DOCUMENTS

| | | | |
|---|---|---|---|
| 4,023,028 | 5/1977 | Dillard | 364/726 |
| 4,058,715 | 11/1977 | Niwa | 364/726 |
| 4,093,994 | 6/1978 | Nussbaumer | 364/726 |
| 4,159,528 | 6/1979 | Perry | 364/726 |
| 4,225,937 | 9/1980 | Perreault et al. | 364/726 |
| 4,231,102 | 10/1980 | Barr et al. | 364/726 |
| 4,231,103 | 10/1980 | Timm | 364/726 |
| 4,384,291 | 5/1983 | Lewis et al. | 342/196 |
| 4,393,457 | 7/1983 | New | 364/726 |
| 4,591,857 | 5/1986 | Thor | 242/196 |
| 4,723,125 | 2/1988 | Elleaume | 342/194 |
| 4,772,889 | 9/1988 | Elleaume | 342/194 |

FOREIGN PATENT DOCUMENTS 2732643 2/1979 Fed. Rep. of Germany .

Primary Examiner—Thomas H. Tarcza
Assistant Examiner—Tod Swann
Attorney, Agent, or Firm—Pollock, Vande Sande & Priddy

[57] ABSTRACT

A device for computing a nonrecursive and sliding discrete Fourier transform as applicable in particular to processing of a pulse compression radar signal has N identical and parallel stages ($E_k$) for receiving in each case samples of the input signal ($e_{m+N}$). Each stage comprises two complex rotation operators, two adder-subtracters and two delay circuits and delivers a signal $X_k^{m+1}$ obtained from the following equations:

$$X_k^m = X'_k{}^m \cdot \exp\left( j \cdot 2\pi \cdot \frac{m \cdot k}{N} \right) \quad (1)$$

$$X'_k{}^{m+1} = X'_k{}^m + x'_{m+N} - x'_m \quad (2)$$

$$x'_m = x_m \cdot \exp\left( -j \cdot 2\pi \cdot \frac{m \cdot k}{N} \right) \quad (3)$$

7 Claims, 3 Drawing Sheets

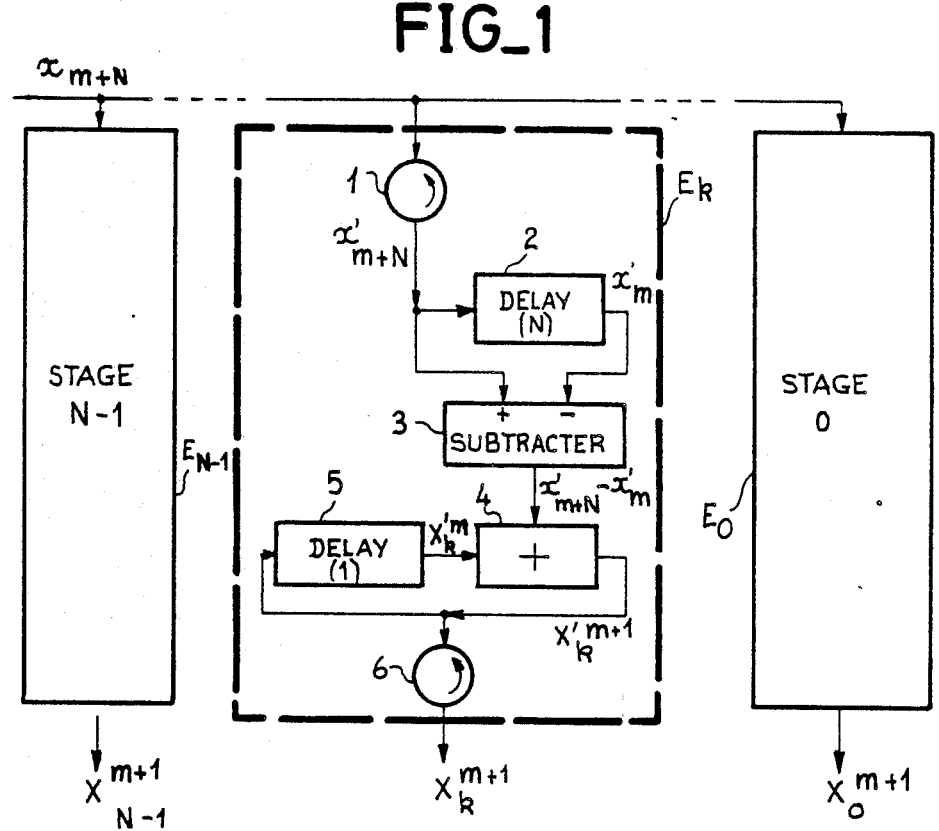
FIG_1
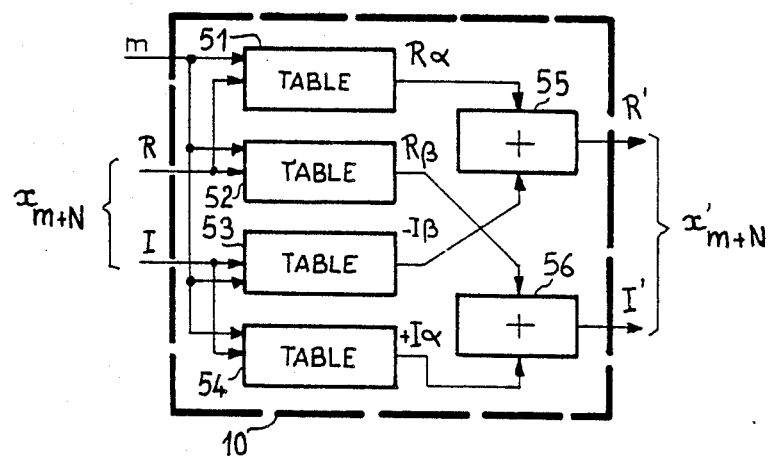
FIG_2

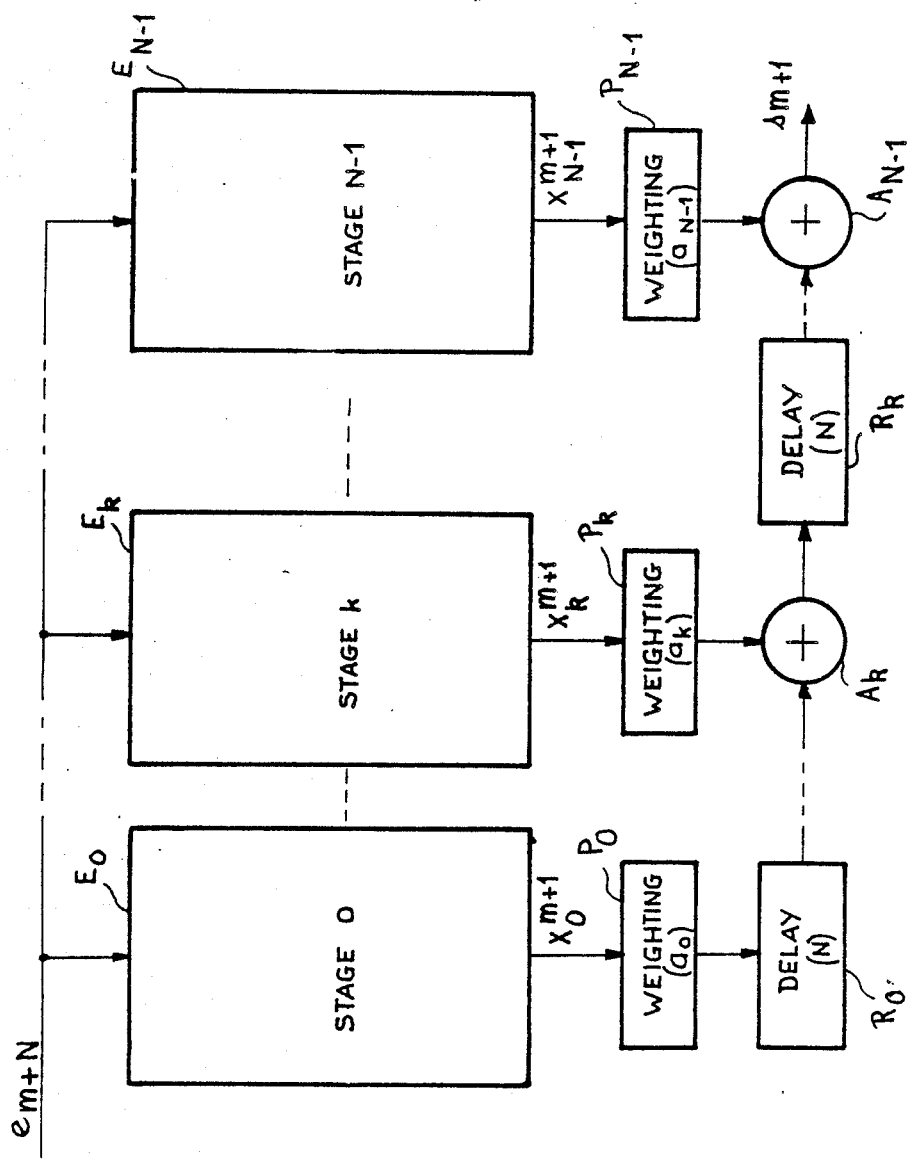
FIG_5

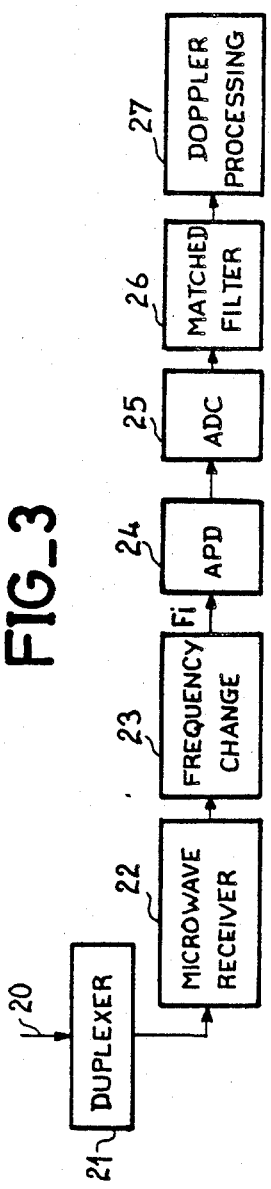
FIG_3
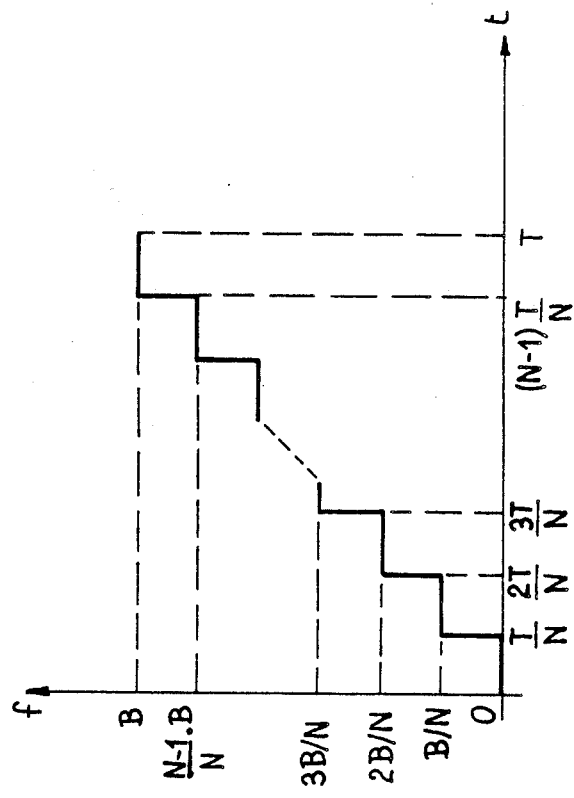
FIG_4

DEVICE FOR COMPUTING A SLIDING AND NONRECURSIVE DISCRETE FOURIER TRANSFORM AND ITS APPLICATION TO A RADAR SYSTEM

BACKGROUND OF THE INVENTION

1. Field of the Invention

The present invention relates to a device for computing a sliding (or moving window) discrete Fourier transform or in other words a discrete Fourier transform applied to a signal in a window which moves or slides in time.

The invention is also concerned with the application of this computing device to a radar system.

2. Description of the Prior Art

It is known that a large number of applications call for computation of the Fourier transform including the filtering operations performed on the received signal in a radar system. Furthermore, current technical and technological developments increasingly indicate the need to seek digital processing solutions. One of the difficulties encountered in this search lies in the computing power which is necessary. This problem is particularly critical in applications such as radar systems in which computations have to be made in real time.

SUMMARY OF THE INVENTION

The present invention is directed to a device for computing a discrete Fourier transform in a sliding time window, thus securing freedom from the influence of accuracy of computations performed at each step. This result is achieved by means of a computation process in which errors arising from recursivity are removed. For the sake of simplification, the term "nonrecursive" is used hereinafter to designate this process.

To this end, the device in accordance with the invention has one or a number of identical stages for receiving samples (x) of the input signal, each stage being intended to deliver a signal (X) of the form $$X_k^{m+1} = +X_k'^{m+1} \cdot \exp\left( j \cdot 2\pi \cdot \frac{(m+1) \cdot k}{N} \right) \quad (1)$$

with $$X_k'^{m+1} = X'^m_k + x'_{m+N} - x'_m \quad (2)$$

$$x'_{m+N} = x_{m+N} \cdot \exp\left( -j \cdot 2\pi \cdot \frac{m \cdot k}{N} \right) \quad (3)$$

where k is the stage index, m is the window index and N is the number of samples in the window. The desired signal is produced by means of complex rotation operators, adder-subtracters and a delay circuit.

The invention is also concerned with the application of this device to pulse compression in a radar signal-processing chain.

BRIEF DESCRIPTION OF THE DRAWINGS

FIG. 1 is a schematic diagram of the computing device in accordance with the invention.

FIG. 2 is a schematic diagram of one of the operators employed in the previous figure.

FIG. 3 is a block diagram of a radar receiver and of the related signal-processing chain.

FIG. 4 is an explanatory diagram.

FIG. 5 is a diagram showing the application of the device in accordance with the invention to pulse compression in a radar signal-processing chain.

In these different figures, the same references designate the same elements.

DETAILED DESCRIPTION OF THE INVENTION

Before proceeding to a specific description of the accompanying drawings which illustrate the computing device in accordance with the invention, it is first necessary to review a few basic principles of the discrete Fourier transform (DFT).

It is recalled that, by means of the discrete Fourier transform, a set of N frequency components $X_k$ with k varying from 0 to N−1 can be made to correspond to N samples of a time-varying signal x(t). If $x_n$ designates the sample of order $n(0 \leq n \leq N-1)$ of the signal x(t), the sampling operation being carried out with a period $\tau$ and in a time window having a duration T with $T = N \cdot \tau$, the correspondence is of the form $$X_k = \sum_{n=0}^{N-1} x_n \cdot \exp\left( -j \cdot 2\pi \cdot \frac{k \cdot n}{N} \right),$$

and, as is already known, the inverse transform is written $$x_n = \sum_{k=0}^{N-1} X_k \cdot \exp\left( +j \cdot 2\pi \cdot \frac{k \cdot n}{N} \right)$$

When it is desired to apply a Fourier transform of this type to a signal x(t) in an N-point sliding time window, then in the case of the X components and a window having an index m, the following expression is obtained:

$$X_k^m = \sum_{n=0}^{N-1} x_{m+n} \cdot \exp\left( -j \cdot 2\pi \cdot \frac{k \cdot n}{N} \right) \quad (4)$$

It is apparent that the computation of these components calls for a large number of operations and consequently for extensive computing power. As mentioned earlier, the problem is aggravated by the fact that in certain applications such as radar systems these computations are to be carried out in real time.

Calculations show that the operations required are partially redundant and a computation algorithm can be found which minimizes the number of required operations. This algorithm makes it possible to obtain the term $X_k^{m+1}$ from the sample $x_m$ of the signal and from the previously computed term $(X_k^m)$ in the following manner:

$$X_k^{m+1} = \{X_k^m + x_{m+N} - x_m\} \cdot \exp\{+j \cdot 2\pi \cdot k/N\} \quad (5)$$

In fact, starting with expression (4) and applying it to a window which has moved by one sampling period (window having an index m+1), we obtain $$X_k^{m+1} = \sum_{n=0}^{N-1} x_{m+1+n} \cdot \exp\left(-j \cdot 2\pi \cdot \frac{k \cdot n}{N}\right)$$

The following change of variable is made:

$$n' = n+1$$

whence $$X_k^{m+1} = \sum_{n'=1}^{N} x_{m+n'} \cdot \exp\left(-j \cdot 2\pi \cdot \frac{k \cdot (n'-1)}{N}\right)$$

or again $$X_k^{m+1} = \left[\sum_{n'=1}^{N} x_{m+n'} \cdot \exp\left(-j \cdot 2\pi \cdot \frac{k \cdot n'}{N}\right)\right] \cdot \exp\left(+j \cdot 2\pi \cdot \frac{k}{N}\right) =$$

$$\left[\sum_{n'=1}^{N-1} x_{m+n'} \cdot \exp\left(-j \cdot 2\pi \cdot \frac{k \cdot n'}{N}\right) - x_m \cdot \exp\left(-j \cdot 2\pi \cdot \frac{k \cdot 0}{N}\right) + x_{m+N} \cdot \exp\left(-j \cdot 2\pi \cdot \frac{k \cdot N}{N}\right)\right] \cdot$$

$$\exp\left(+j \cdot 2\pi \cdot \frac{k}{N}\right) = \{X_k^m + x_{m+N} - x_m\} \cdot \exp\left(+j \cdot 2\pi \cdot \frac{k}{N}\right)$$

which is expression (5).

The foregoing expression is recursive i.e. the $(m+1)^{th}$ value of the quantity $X_k^{m+1}$ depends on the value obtained for the previous quantity $X_k^m$.

In some cases, it may be preferable to avoid the requirement of computational accuracy at each step, even at the cost of a slight increase in the volume of computation to be performed.

Calculations made by the present Applicant show that expression (5) can be written in the form of the system of equations (1), (2) and (3) mentioned earlier.

In fact, it is possible in expression (5) to carry out the following change of variable $$X'^m_k = X_k^m \cdot \exp\left(-j \cdot 2\pi \cdot \frac{m \cdot k}{N}\right)$$

or, conversely, $$X_k^m = X'^m_k \cdot \exp\left(+j \cdot 2\pi \cdot \frac{m \cdot k}{N}\right) \text{ which is equation (1).}$$

By transferring this into expression (5), we obtain $$X'^{m+1}_k \cdot \exp\left(j \cdot 2\pi \cdot \frac{(m+1)k}{N}\right) =$$

$$\left[X'^m_k \cdot \exp\left(j \cdot 2\pi \frac{m \cdot k}{N}\right) + x_{m+N} - x_m\right] \cdot$$

$$\exp\left(j \cdot 2\pi \cdot \frac{k}{N}\right)$$

or again $$X'^{m+1}_k = X'^m_k + x_{m+N} \cdot \exp\left(-j \cdot 2\pi \cdot \frac{m \cdot k}{N}\right) -$$

$$x_m \cdot \exp\left(-j \cdot 2\pi \cdot \frac{m \cdot k}{N}\right)$$

If one sets the following change of variable:

$$x'_{m+N} = x_{m+N} \cdot \exp\left(-j \cdot 2\pi \cdot \frac{m \cdot k}{N}\right) \text{ which is equation (3).}$$

we again find the following expression, which is equation (2):

$$X'^{m+1}_k = X'^m_k + x'_{m+N} - x'_m$$

It is thus apparent that the combined set of equations (1), (2) and (3) forms a new expression of the sliding DFT in which there no longer exists any recursivity based error.

In equation (5) all the terms, particularly the window input $(x_{m+N})$ and the output $(x_m)$ samples, are multiplied by the complex term $\exp\{j \cdot 2\pi \cdot k/N\}$ which is not exactly computable in practice. On the other hand, in equation (2) which is the only recursive equation of the system (1)-(3), two input $(x'_{m+N})$ and output $(x'_m)$ terms are independent from the preceding exponential. Accordingly, the values of these terms, once calculated, remain constant along the entire window, thus avoiding consequences of calculation error. Although the process still is of the recursive type, there is no longer error due to recursivity in the execution of said process. For this reason and in order to simplify, this process is referred to as nonrecursive process.

FIG. 1 represents a device for computing a "nonrecursive" sliding DFT as defined by equations (1), (2) and (3).

This figure shows a plurality of N stages designated as $E_0 \ldots E_k \ldots E_{N-1}$. Each of these stages receives a sample $x_{m+N}$ of the signal $x(t)$ on which it is desired to form a Fourier transform. Each stage delivers at its output a signal $X^{m+1}$ which bears the stage index $(0 \ldots k \ldots N-1)$.

The different stages are identical and arranged as shown in the figure in the case of one stage having the index k.

Each stage has a complex rotation operator 1 which receives the sample $x_{m+N}$ and delivers at the output the signal $x'_{m+N}$ as defined by equation (3). The signal just mentioned is input to a subtracter 3 on the one hand directly to the positive input of said subtracter and on the other hand to the negative input via a delay circuit 2. This circuit introduces a delay of N sampling periods in the signal $x'_{m+N}$: the output signal of the circuit 2 is then denoted $x'_m$. By way of example, the delay circuit 2 is formed by means of an N-stage shift register. The output signal of the subtracter 3 which is then of the form $x'_{n+N} - x'_m$ is delivered input to an adder 4 which also receives its own output signal as generated in the previous stage. In other words, the output of the adder 4 is connected to its input via a delay circuit 5. The output of adder 4 is the signal $X'^{m+1}_k$ as defined by equation (2). The output signal of the adder 4 is also input to a second complex rotation operator 6 which makes it possible by means of the signal $X'^{m+1}_k$ to obtain the signal $X^{m+1}_k$ as defined by the equation (1) given (by subjecting it to a complex rotation exp $\{j \cdot 2\pi \cdot k \cdot (m+1/N)\}$).

It is worthy of note that, at the time of initialization of the device, when the first sample ($x_o$) is received, all the operators and registers must be at zero.

A computing device of this type can be employed for example for spectrum analysis of a signal x(t) by providing this latter with its N frequency components $X_k$.

It is also worthy of note that a device of this type may have only one stage E and finds a practical application, for example, in the construction of a filter matched with a whole number of periods of a sine-wave having a predetermined frequency as will be explained below.

FIG. 2 shows one form of construction of the complex rotation operators employed in the device in accordance with the invention, the operator 1 in FIG. 1 by way of example.

The input datum $x_{m+N}$ of the operator 1 is clearly represented by its real part and its imaginary part designated respectively as R and I.

It should be noted that, in all the circuits herein described by way of example, the complex quantities are expressed as real part—imaginary part, either in parallel form (example of FIG. 2) or in series form.

In accordance with known practice, the performance of a complex rotation exp $\{j \cdot 2\pi \cdot (k \cdot m)/N\}$ on a complex quantity $R + j I$ is equivalent to forming the product $$(R + j I) \cdot (\alpha + j\beta),$$

if $\alpha$ and $\beta$ are the real and imaginary parts of the expression exp $\{j \cdot 2\pi \cdot (k \cdot m)/N\}$. The development of the product shows that it is equivalent to $$(R\alpha - I\beta) + j(R\beta + I\alpha)$$

An operator 10 for carrying out this operation is shown in FIG. 2.

This operator has four tables which are stored respectively for example in ROM-type memories 51-54. The first two ROMs receive the datum R and the last two ROMs receive the datum I. They further each receive the value of the index m, given modulo N. These memories supply the quantities $R\alpha$, $R\beta$, $-I\beta$ and $I\alpha$ respectively. The first and third of these data are added in an adder 55 in order to form the real part R' of the quantity $x'_{m+N}$. The second and fourth of these data are added in an adder 56 so as to form the imaginary part I' of the quantity $x'_{m+N}$.

In an alternative embodiment, it is possible to employ only two memories and a single adder: the memories deliver, upon external control, in a first step the quantities $R\alpha$ and $-I\beta$ which, when added, form the real part R'. In a second step, the memories deliver the other two quantities ($R\beta$ and $I\alpha$) which are in turn added so as to yield I'.

It may usefully be noted that a multiplier is not essential in this example of construction. Other designs may clearly be contemplated, including in particular those which call for the use of a multiplier.

An operator like operator 10 can be used to realize operators 6 or 1 in FIG. 1. However, operator 6 must further receive value m+1 in lieu of m, or this fact must be integrated in the data stored in the memories 51-54. Concerning operator 1, the data stored in the memories must integrate the minus sign.

As stated earlier, a computing device of the type described in FIG. 1 can be employed in the signal-processing chain of a pulse compression radar in order to constitute a matched filter.

It is recalled that the most effective method for the achievement of optimum processing of a signal in background noise is to pass the signal through a filter which is "matched" with the signal or in other words a filter whose transmittance is the conjugate of the signal spectrum.

It is also recalled that the object of the method known as pulse compression is to improve the distance resolution of a radar system while at the same time making it possible to obtain a pulse having a long time duration T. This method consists in providing a dispersive line (frequency delay line) in the radar transmission chain. The effect thereby achieved is to lengthen (or "expand") the signal and to compensate this effect on reception or, in other words, to compress the received signal. In order to form the "expanded" signal, a procedure widely adopted in practice is to choose a sawtooth frequency waveform or in other words a linear frequency modulation for reasons of resistance to Doppler. The problem which then arises on reception is to provide a filter which is matched with the above-mentioned sawtooth frequency waveform. This is the problem to which consideration will be given below.

Moreover, when digital techniques are employed, it is often sought to arrive at an approximation of the sawtooth frequency waveform which is such as to facilitate the matched filtering operation to be performed at a subsequent stage. One form of this approximation is known as the Frank code. The term "code" is intended to mean a signal whose characteristics are capable of varying in time, this variation being deterministic or pseudorandom (known at the transmitter). It is also recalled that the Frank approximation is written as follows:

$$x(t) = \exp\{j \cdot 2\pi \cdot f(t) \cdot t\}$$

where:
- $t \in [0; T[$;
- $f \in [0; B[$ and $f(t) = \frac{k(t)}{N} B$;

B is the frequency band of the signal x(t). The signal x(t) therefore has a staircase waveform as illustrated in FIG. 4: a series of N stair-steps which extend in time over an interval T, each stair-step of order i being characterized by a frequency (iB)/N and a time-duration T/N.

Using the notations given earlier, one chooses:

$$BT = N^2$$

-continued
$$f_e = B \longleftrightarrow \tau = \frac{1}{B},$$

which results in a whole number of complex sine-waves per stair-step and the different steps are therefore joined to each other without any phase jump. Furthermore, since there are N stair-steps, there are N samples per step.

It is a known practice to carry out matched filtering of Frank codes by means of fast Fourier transform algorithms by setting $N=2^q$, with the result that $$B \cdot T = (2^q)^2$$

In fact, the fast fourier transform (FFT) algorithms are more specifically suited to powers of two.

In this case, however, the permissible number of pulse compression ratios is limited (it is recalled that the compression ratio is given by the product B.T). For example, where N is a whole number between 1 and 16, the only permissible pulse compression ratios are 1, 4, 16, 64 and 256. This constitutes a disadvantage, primarily for the following two reasons:

- the fact of being limited to a few precise values of the product BT is objectionable since there is not a free choice of each parameter B and T. Thus the duration T is governed by the desired radar power and range whereas the frequency band B is governed by the desired resolution;
- the relative divergence between the different possible compression ratios is considerable in the case of high values of the product BT whereas, in certain applications (such as multimode radars), it is found desirable to produce a finer variation in these parameters.

In accordance with the invention, in order to provide a matched filter for each stair-step, a sliding discrete Fourier transform (DFT) is employed as defined by the expressions (1), (2) and (3) given earlier. It is in fact demonstrated below that the sliding DFT is a filter which is matched with a signal formed by a whole number of complex sine-waves.

In fact, let a signal x(t) constituted by a whole number of complex sine-waves be $$x(t) = \exp\{j \cdot 2\pi \cdot f \cdot t\}$$
with $t \in [0: T[$
$f = k \cdot \frac{1}{T}$ If a sampling frequency $f_e$ is chosen such that $$f_e = N \cdot \frac{1}{T} \text{ (with } N > k_{max}\text{)},$$

we may write the sampled signal x'(t) in the form $$x'(t) = \sum_{n=0}^{N-1} x_n \cdot \delta(t - n\tau) \quad (6)$$

where:
$\delta$ is the Dirac function
$\tau$ is the sampling period ($\tau = 1/f_e$)
$x_n$ is the signal x(t) sampled at the $n^{th}$ sampling period ($\tau$), then $$x_n = \exp\{j \cdot 2\pi \cdot f \cdot n \cdot \tau\} \quad (7)$$
$$= \exp\left\{j \cdot 2\pi \cdot \frac{k \cdot n}{N}\right\}$$

The transmittance H(f) of the filter which is matched with the sampled signal x'(t) is the complex conjugate of the spectrum X'(f) of this signal:

$$H(f) = \overline{X'(f)}$$

or, in the time domain, $$h(t) = \overline{x'(-t)} \quad (8)$$

h(t) being the Fourier transform of the transmittance H(f). From expressions (6), (7) and (8), we deduce $$h(t) = \sum_{n=0}^{N-1} \exp\left\{-j \cdot 2\pi \cdot \frac{k \cdot n}{N}\right\} \cdot \delta(-t - n\tau) \quad (9)$$

If a signal e(t) is applied to a filter having a response which is given by expression (9), there is obtained at the output of the filter a signal s(t) defined by $$s(t) = h(t) * e(t)$$

where the sign * represents a convolution product, that is to say, $$s(t) = \int_{-\infty}^{+\infty} e(t - u) \cdot h(u) \cdot du$$

By replacing h(u) in the preceding expression by its value given by expression (9), we obtain $$s(t) = \sum_{n=0}^{N-1} \left\{ \int_{-\infty}^{+\infty} e(t - u) \cdot \delta(-u - n\tau) \cdot du \right\} \cdot$$
$$\exp\left\{-j \cdot 2\pi \cdot \frac{k \cdot n}{N}\right\}$$
$$= \sum_{n=0}^{N-1} e(t + n\tau) \cdot \exp\left\{-j \cdot 2\pi \cdot \frac{k \cdot n}{N}\right\}$$

If we consider the output signal after it is sampled, that is, $s(m\tau)$ denoted $s_m$, we have $$s_m = \sum_{n=0}^{N-1} e_{m+n} \cdot \exp\left\{-j \cdot 2\pi \cdot \frac{k \cdot n}{N}\right\}$$

This expression is of the same form as expression (4) given earlier or, in other words, the output signal (s) is obtained by forming a sliding DFT on the input signal (e).

In accordance with the invention, pulse compression is therefore achieved in a radar chain by means of the device described with reference to FIG. 1.

FIG. 3 is a schematic representation which serves to recall the general arrangement of a chain for receiving and processing a pulse-compression radar signal in which the device in accordance with the invention is capable of being inserted.

The radar signal is received by an antenna 20 and directed via a duplexer 21 to the receiving portion of the radar. This receiving portion mainly comprises in cascade:

a microwave receiver 22;
an assembly 23 of frequency-changing circuits for transposing the signal received at microwave frequency to a signal at intermediate frequency (IF);
an amplitude and phase demodulation (APD) device 24;
an analog-to-digital converter (ADC) 25 for digitization of the radar signal;
a matched filter 26;
an assembly 27 of circuits for Doppler processing if required.

It is worthy of note that the matched filter 26 may be placed after the Doppler processing circuits 27 if necessary. In the same order of ideas, when the demodulator 24 is of digital design, it may be placed at any point in the chain although naturally after the converter 25.

In accordance with the invention, the matched filter 26 is realized by means of a device for computation of a sliding discrete Fourier transform as defined by equations (1), (2) and (3) when the transmitted signal is a linear sawtooth frequency waveform in which the product BT is equal to the square of a whole number ($N^2$), the advantage of this realization being the possibility of adopting any predetermined number N.

FIG. 5 shows one mode of construction of this filter.

In FIG. 5, there ar again shown N stages $E_o \ldots E_k \ldots E_{N-1}$ which receive in parallel a sample $e_{m+N}$ of the input signal. The stage $E_k$ delivers at its output the quantity $X_k^{m+1}$. Each quantity $X_k^{m+1}$ is summed (adder $A_k$) with the preceding quantity $X_{k-1}^{m+1}$ after being subjected to a delay $R_k$ equal to N sampling periods. The circuit $R_k$ is constructed for example by means of an N-stage shift register. Summation is performed up to the last stage ($E_{N-1}$) in order to produce the output signal $s_{m+1}$.

The insertion of a time-delay of N periods at the level of each stage E is made necessary by the fact that the system of FIG. 5 involves simultaneous computation of the first point of each of the N stair-steps which are separated from each other by N sampling periods. In order to obtain the signal s, it is therefore necessary to make a correction. It is readily apparent that this correction is necessary only in the event that the N stair-steps are emitted successively. Should they be emitted simultaneously, the time-delays $R_k$ no longer serve any useful purpose.

Furthermore, in the embodiment shown in FIG. 5, a weighting device $P_k$ is interposed between the output of the stage $E_k$ and the adder $A_k$. This is in fact an optional amplitude weighting, the object of which is to reduce the level of the sidelobes. However, this weighting results in losses due to mismatching which occurs in such a case with respect to the theoretical matched filter.

What is claimed is:

1. A device for computing a sliding discrete Fourier transform in a time window of duration T for producing an output representing at least one component ($X_k^{m+1}$) of said transform from N samples ($x_{m+N}$) of an input signal whose transform is to be computed, wherein said computing device has at least one stage ($E_k$) for receiving samples and comprising complex rotation operator means as well as adding and/or subtracting means and delay circuits for delivering said component ($X_k^{m+1}$) defined by $$X_k^{m+1} = X'_k^{m+1} \cdot \exp\{j \cdot 2\pi \cdot (m+1 \cdot k/N)\} \quad (1)$$

with $$X'_k^{m+1} = X'_k^{m} + x'_{m+N} - x'_m \quad (2)$$

$$x'_m = x_{m+N} \cdot \exp\{-j \cdot 2\pi \cdot (m \cdot k/N)\} \quad (3)$$

where k is the stage index and m is the window index.

2. A device according to claim 1, wherein said device comprises N identical stages mounted in parallel.

3. A device as recited in claim 2, and further including summing means for summing outputs of at least two of said stages, delay means for delaying an output of at least one said stage, said summing means having an input coupled to an output of one stage and an output of said delay means.

4. A device according to claim 1, wherein each stage ($E_k$) comprises:
   first complex rotation operator means for receiving said samples ($x_{m+N}$) successively and subjecting them to a complex rotation operation in order to obtain the quantity ($x'_{m+N}$) defined by equation (3);
   a first delay circuit for receiving a quantity ($x'_{m+N}$) derived from the first complex rotation operator means to delay said quantity by N sampling periods to output said delayed quantity;
   means for subtracting a quantity derived from the first delay circuit from the quantity derived from the first complex rotation operator means to output a corresponding result;
   means for adding the result output from the subtracting means to a quantity previously computed by said adding means to output a sum;
   a second delay circuit for receiving the sum ($X'_k^{m+1}$) derived from the adding means to delay said sum by one sampling period and then to deliver said delayed sum to said adding means as the previously computed quantity;
   second complex rotation operator means for receiving the sum ($X'_k^{m+1}$) derived from the adding means and subjecting said sum to a complex rotation in order to obtain said component ($X_k^{m+1}$) defined by equation (1).

5. A device according to claim 4, wherein at least one of said first and second complex rotation operator means comprises four memories, each of said memories receiving a real or imaginary part of the sample subjected to a complex rotation exp. $\{j \cdot 2\pi \cdot (k/N) \cdot m\}$ and index m, each of said memories delivering a product of said part of the sample and a real or imaginary part of the above exponential, sum means responsive to the products delivered by said memories for summing to form an output of said complex rotation operator means.

6. A device as recited in claim 5, and further including amplitude-weighting means coupled to outputs of said stages.

7. A radar system equipped with a radar signal receiving chain and a means for performing matched filtering and pulse compression, wherein said means for performing matched filtering and pulse compression include a device as recited in claim 1.

* * * * *